US012585054B2

(12) United States Patent
Song et al.

(10) Patent No.: US 12,585,054 B2
(45) Date of Patent: Mar. 24, 2026

(54) SUNROOF SYSTEM FOR PERFORMING PASSIVE RADIATIVE COOLING

(71) Applicants: FOEL INC., Gwangju (KR); GWANGJU INSTITUTE OF SCIENCE AND TECHNOLOGY, Gwangju (KR)

(72) Inventors: Young Min Song, Gwangju (KR); Do Hyeon Kim, Gwangju (KR); Gil Ju Lee, Gwangju (KR); Se-Yeon Heo, Gwangju (KR); Jong Heon Lee, Gwangju (KR)

(73) Assignees: FOEL INC., Gwangju (KR); GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 335 days.

(21) Appl. No.: 18/119,917

(22) Filed: Mar. 10, 2023

(65) Prior Publication Data

US 2023/0213694 A1     Jul. 6, 2023

Related U.S. Application Data

(63) Continuation of application No. PCT/KR2021/012378, filed on Sep. 10, 2021.

(30) Foreign Application Priority Data

Sep. 11, 2020     (KR) ........................ 10-2020-0116896
Sep. 18, 2020     (KR) ........................ 10-2020-0120909

(51) Int. Cl.
 *G02B 5/20*     (2006.01)
 *B60J 7/047*     (2006.01)
(Continued)

(52) U.S. Cl.
 CPC .............. *G02B 5/208* (2013.01); *B60J 7/047* (2013.01); *C08F 10/02* (2013.01); *C08F 10/06* (2013.01); *G02B 1/04* (2013.01); *G02B 5/26* (2013.01)

(58) Field of Classification Search
 CPC . G02B 5/208; G02B 1/04; G02B 5/26; G02B 5/08; G02B 5/22; G02B 5/20;
(Continued)

(56) References Cited

U.S. PATENT DOCUMENTS 11,125,514 B2 *   9/2021   Gan ...................... F28D 15/025
11,873,440 B2 *   1/2024   Shin ......................... C09K 5/00
(Continued)

FOREIGN PATENT DOCUMENTS

CN          116813975 A   *   9/2023
JP          H07101242 B2     11/1995
(Continued)

*Primary Examiner* — William Lu
(74) *Attorney, Agent, or Firm* — Dinsmore & Shohl LLP; Yongsok Choi, Esq.

(57)          ABSTRACT

The present disclosure provides a sunroof system for a vehicle including glass slidably insertable into a vehicle body of the vehicle, and a passive radiant cooling layer disposed below the glass and slidably insertable into the vehicle body. The passive radiant cooling layer includes at least two layers among a first emission layer having a high emissivity in a first band relative to a band outside the first band, a second emission layer having a high emissivity in a second band, which is included in the first band and narrower than the first band, relative to a band outside the second band, and a reflection layer having a high reflectivity in a third band, which is a shorter wavelength than the first band, relative to a band outside the third band.

11 Claims, 16 Drawing Sheets

(51) Int. Cl.

| | | |
|---|---|---|
| *C08F 10/02* | (2006.01) | |
| *C08F 10/06* | (2006.01) | |
| *G02B 1/04* | (2006.01) | |
| *G02B 5/26* | (2006.01) | |

(58) Field of Classification Search
CPC . B60J 7/047; B60J 7/043; C08F 10/02; C08F 10/06; C08L 23/06; C08L 23/12; F25B 23/00; F28F 13/18
See application file for complete search history.

(56) References Cited

U.S. PATENT DOCUMENTS

| | | | | |
|---|---|---|---|---|
| 12,194,723 | B2 * | 1/2025 | Suemitsu | B32B 15/08 |
| 12,352,464 | B2 * | 7/2025 | Hebrink | F24S 20/66 |
| 2005/0133082 | A1 * | 6/2005 | Konold | H02S 40/44 |
| | | | | 136/246 |
| 2006/0283969 | A1 * | 12/2006 | Ross | F24D 3/141 |
| | | | | 237/70 |
| 2010/0200837 | A1 * | 8/2010 | Zimmerman | H01L 21/02403 |
| | | | | 257/14 |
| 2016/0362807 | A1 * | 12/2016 | Casse | F28F 13/185 |
| 2016/0363396 | A1 * | 12/2016 | Liu | F28B 1/06 |
| 2018/0180331 | A1 * | 6/2018 | Yu | F24S 70/60 |
| 2018/0244928 | A1 * | 8/2018 | Van Overmeere | C09D 5/004 |
| 2018/0354848 | A1 * | 12/2018 | Van Overmeere | C03C 17/42 |
| 2019/0291549 | A1 * | 9/2019 | Matsui | B60J 7/05 |
| 2019/0316854 | A1 * | 10/2019 | Fain | H10F 77/60 |
| 2020/0012024 | A1 * | 1/2020 | Ono | G02B 5/207 |
| 2020/0353728 | A1 * | 11/2020 | de Melo Kort-Kamp | |
| | | | | F24S 70/10 |
| 2020/0393148 | A1 * | 12/2020 | Teitelbaum | F24D 3/14 |
| 2020/0400391 | A1 * | 12/2020 | Suemitsu | B32B 15/043 |
| 2021/0002165 | A1 * | 1/2021 | Wang | C03C 17/3634 |
| 2021/0123558 | A1 * | 4/2021 | Leroy | C08J 9/28 |
| 2022/0221627 | A1 * | 7/2022 | Hebrink | B32B 3/30 |
| 2022/0381524 | A1 * | 12/2022 | Mandal | B60H 1/22 |
| 2023/0106815 | A1 * | 4/2023 | Roehling | F28F 21/06 |
| | | | | 428/312.8 |
| 2024/0361661 | A1 * | 10/2024 | Agrawal | G02F 1/1503 |

FOREIGN PATENT DOCUMENTS

| | | | | |
|---|---|---|---|---|
| JP | 2018526599 A | | 9/2018 | |
| JP | 6602487 B2 | | 11/2019 | |
| JP | 3227268 U | | 8/2020 | |
| JP | WO2020022156 A1 | | 12/2020 | |
| KR | 1020160147649 A | | 12/2016 | |
| KR | 1020190101870 A | | 9/2019 | |
| KR | 1020190118755 A | | 10/2019 | |
| KR | 1020190130985 A | | 11/2019 | |
| KR | 20210000278 A | * | 1/2021 | B32B 9/045 |
| KR | 20210109312 A | * | 9/2021 | B32B 7/027 |
| WO | WO-2016205717 A1 | * | 12/2016 | F24S 70/30 |
| WO | WO-2020240366 A1 | * | 12/2020 | F24S 21/00 |
| WO | WO-2022055312 A1 | * | 3/2022 | G02B 5/22 |

* cited by examiner

SUNROOF SYSTEM FOR PERFORMING PASSIVE RADIATIVE COOLING

CROSS-REFERENCE TO RELATED APPLICATION

The present application is a continuation of International Application No. PCT/KR2021/012378, filed on Sep. 10, 2021, which claims the benefit of Korean Patent Application No. 10-2020-0116896 filed on Sep. 11, 2020 and No. 10-2020-0120909 filed on Sep. 18, 2020 in the Korean Intellectual Property Office, the entire disclosure of each of which is incorporated herein by reference.

TECHNICAL FIELD

Embodiments of the present disclosure relate to a sunroof system for performing passive radiant cooling.

BACKGROUND ART

Due to the depletion of fuel for conventional cooling systems and higher recognition of environmental problems, demands for new cooling technologies to address the same are increasing. Passive radiant cooling structures have the property of reducing the temperature of heating products or buildings or plants without the use of fossil fuels such as oil and coals and without the supply of an external power source, and thus, are attracting attention as an ultra-power-saving and eco-friendly technology. The passive radiant cooling structures are clearly distinguished from conduction and convection methods, which induce thermal equilibrium, and in recent years, research on passive radiant cooling structures that can be used universally during the day and night as well as at night has been actively conducted in developed countries such as the United States and Europe.

However, conventional passive radiant cooling structures or emitters included in the passive radiant cooling structures have high solar absorption, and thus may not simultaneously satisfy the characteristics of high solar reflection and selective radiation. In addition, complicated processes such as patterning are used to simultaneously satisfy these two characteristics, which is a disadvantage for large-area processes.

Meanwhile, the passive radiant cooling structure for daytime use should strongly reflect sunlight and effectively emit internal heat to an external space in the form of electromagnetic waves. Accordingly, an ideal radiant cooling structure should reflect light having a wavelength of 280 nm to 3000 nm as much as possible, and emit an electromagnetic wave in a region of 8 μm to 13 μm, which is the atmosphere window region, as much as possible. Since optical designs covering all of the visible light band, the near-infrared band, and the long-infrared band are extremely complex, previous developments have focused on nighttime cooling systems that exclude the effects of sunlight.

A conventional sunroof system for a vehicle is configured as a dual form of sunroof glass, and a sunshade or roller blind in order to block light from entering through the sunroof glass.

SUMMARY

Technical Problem

The present disclosure has been made in view of the above problems, and it is an object of the present disclosure to provide a cooling structure that simultaneously satisfies high solar reflectance and selective emissivity in a specific wavelength band.

In addition, the present disclosure relates to a sunroof system for a vehicle, and is directed to providing a sunroof system capable of continuously emitting heat inside the vehicle by applying a passive radiant cooling structure to minimize the increase in temperature inside the vehicle due to the greenhouse effect of an enclosed space in the vehicle.

However, these objects are merely exemplary, and the scope of the present disclosure should not be limited thereto.

Technical Solution to Problem

A radiant cooling structure according to an embodiment of the present disclosure may include a first functional layer having a high emissivity in a fourth band relative to a band outside the fourth band and a second functional layer located adjacent to the first functional layer and having a high reflectivity in at least one direction in a fifth band different from the fourth band relative to a band outside the fifth band.

A sunroof system for a vehicle according to various embodiments of the present disclosure may include glass slidably insertable into a vehicle body of the vehicle, and a passive radiant cooling layer disposed below the glass and slidably insertable into the vehicle body, wherein the passive radiant cooling layer may include at least two layers among a first emission layer having a high emissivity in a first band relative to a band outside the first band, a second emission layer having a high emissivity in a second band, which is included in the first band and narrower than the first band, relative to a band outside the second band, and a reflection layer having a high reflectivity in a third band, which is a shorter wavelength than the first band, relative to a band outside the third band.

Advantageous Effects of Disclosure

According to an embodiment of the present disclosure made as described above, a radiant cooling structure satisfying both high solar reflectance and selective emissivity can be provided.

A radiant cooling structure according to an embodiment of the present disclosure can have high cooling efficiency and can be largely independent of an external climatic environment.

In a radiant cooling structure according to an embodiment of the present disclosure, selective emissivity can be satisfied and a large-area selective emission layer can be formed, without a complicated process such as a patterning process.

In addition, according to an embodiment of the present disclosure, the increase in temperature inside a vehicle due to the greenhouse effect can be minimized.

A sunroof system for a vehicle, to which a radiant cooling structure according to an embodiment of the present disclosure is applied, can have high cooling efficiency and can be largely independent of an external climatic environment.

In a sunroof system for a vehicle, to which a radiant cooling structure according to an embodiment of the present disclosure is applied, a selective emission layer or a broadband emission layer of large area can be formed without a complicated process.

Of course, the scope of the present disclosure is not limited by these effects.

DETAILED DESCRIPTION

Figure 1:
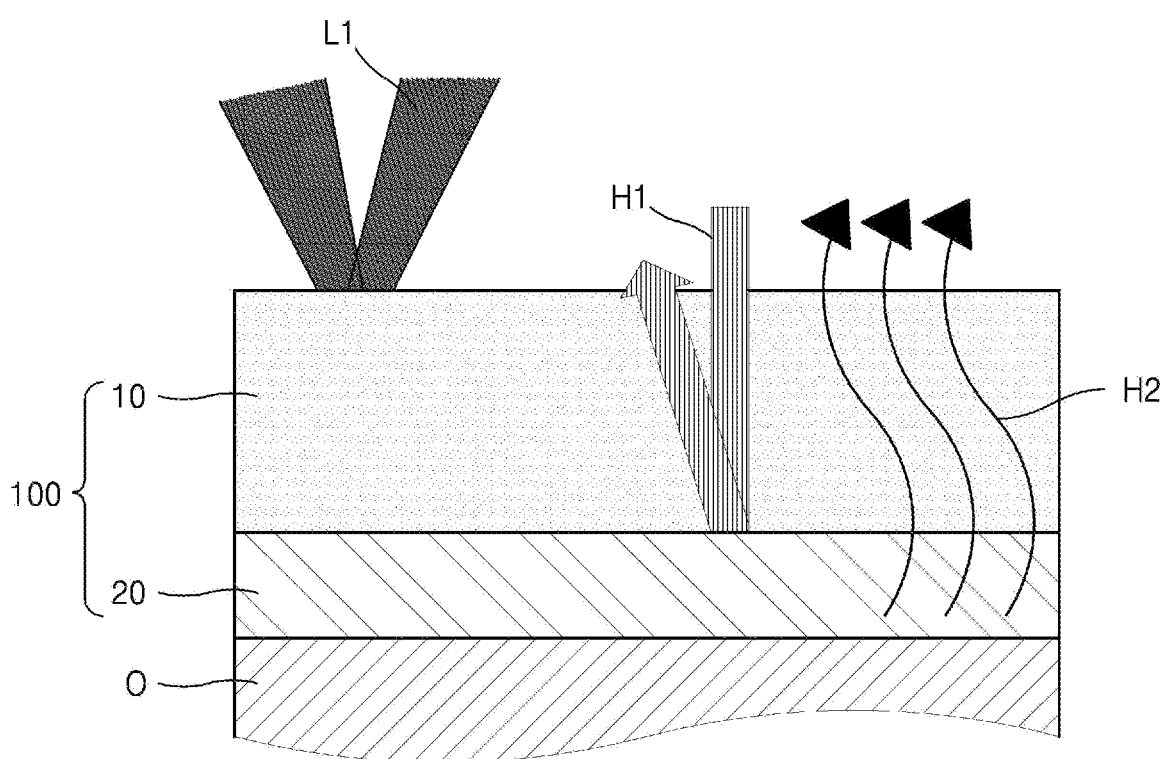
FIG. 1 illustrates a schematic structure of a radiant cooling structure according to an embodiment of the present disclosure.

A sunroof system for a vehicle according to various embodiments of the present disclosure may include glass slidably insertable into a vehicle body of the vehicle, and a passive radiant cooling layer disposed below the glass and slidably insertable into the vehicle body, wherein the passive radiant cooling layer may include at least two layers among a first emission layer having a high emissivity in a first band relative to a band outside the first band, a second emission layer having a high emissivity in a second band, which is included in the first band and narrower than the first band, relative to a band outside the second band, and a reflection layer having a high reflectivity in a third band, which is a shorter wavelength than the first band, relative to a band outside the third band.

According to an embodiment, the passive radiant cooling layer may include the second emission layer and the first emission layer provided below the second emission layer and located adjacent to an inside of the vehicle.

According to an embodiment, the first emission layer may include a lower plate including a material layer in which radiant energy corresponding to the first band is radiated at an emissivity higher than that of radiant energy of the remaining wavelengths except for wavelengths of the first band, and a coating layer made of a metal deposited on an upper portion of the lower plate.

According to an embodiment, the lower plate may have a plurality of insertion grooves formed therein to be recessed downward from an upper surface thereof to a predetermined insertion depth.

According to an embodiment, the second emission layer may be made of polymer transparent to a visible light band and having a predetermined emissivity in an infrared band.

According to another embodiment, the passive radiant cooling layer may include the reflection layer and the second emission layer disposed below the reflection layer and located adjacent to an inside of the vehicle.

According to another embodiment, the second emission layer may include a reflection layer that is reflective with respect to the third band.

According to another embodiment, the second emission layer may include a resonant layer that resonates with respect to at least the second band.

According to another embodiment, the reflection layer may have a high transmittance in the first band relative to a band outside the first band.

According to another embodiment, the second emission layer may be a diffractive structure including a two-dimensional structure or a photonic crystal structure, or may include a polymer having a high absorption rate selectively in the second band.

According to another embodiment, the reflection layer may include polymer transparent to infrared light and including at least one of polyethylene and polypropylene, wherein the polymer may be a porous polymer.

A radiant cooling structure according to an embodiment of the present disclosure may include a first functional layer having a high emissivity in a fourth band relative to a band outside the fourth band and a second functional layer located adjacent to the first functional layer and having a high reflectivity in at least one direction in a fifth band different from the fourth band relative to a band outside the fifth band.

According to an embodiment, the first functional layer may be located more adjacent to an object to be cooled than the second functional layer is.

According to an embodiment, the first functional layer may include a reflection layer that is reflective with respect to the fifth band.

According to an embodiment, the first functional layer may include a resonant layer that resonates with respect to at least the fourth band.

According to an embodiment, the second functional layer may have a high transmittance in a sixth band including the fourth band relative to a band outside the sixth band.

According to an embodiment, the first functional layer may have a high reflectivity in at least one direction in a band outside the fourth band relative to the fourth band.

According to an embodiment, the first functional layer may be a diffractive structure including a two-dimensional structure or a photonic crystal structure, or may include a polymer having a high absorption rate selectively in the fourth band.

According to an embodiment, the second functional layer may include polymer transparent to infrared light and including at least one of polyethylene and polypropylene, wherein the polymer may be a porous polymer.

Other aspects, features, advantages other than those described above will become apparent from the following drawings, claims, and detailed description of the invention.

MODE OF DISCLOSURE

While the present disclosure is susceptible to various modifications and alternative forms, specific embodiments thereof are shown by way of example in the drawings and will herein be described in detail. Advantages and features of the present disclosure and a method of achieving the same should become clear with embodiments described below in detail with reference to the drawings. However, the present disclosure is not limited to the embodiments disclosed below, but may be implemented in various forms.

Hereinafter, the embodiments of the present disclosure will be described below in detail with reference to the accompanying drawings, and when the embodiments of the present disclosure are described with reference to the draw- ings, the same or corresponding components are given the same reference numerals, and repetitive descriptions thereof will be omitted.

In the following embodiments, the terms "first," "second," and the like have been used to distinguish one component from another, rather than limitative in all aspects.

In the following embodiments, singular expressions are intended to include plural expressions as well, unless the context clearly indicates otherwise.

In the following embodiments, the terms such as "includ- ing," "having," and "comprising" are intended to indicate the existence of features or components disclosed in the specification, and are not intended to preclude the possibility that one or more other features or components may be added.

For convenience of description, sizes of components shown in the drawings may be exaggerated or reduced. For example, since the size and thickness of each component illustrated in the drawing are arbitrarily shown for conve- nience of description, the present disclosure is not neces- sarily limited to those illustrated in the drawing.

In the following embodiment, the expression "a portion, such as a region, a component, a unit, a layer, or the like is present "on" or "over" another portion" includes not only the expression 'the portion is present "directly on" another portion' but also the expression 'another region, component, unit, layer, or the like interposed therebetween.'

FIG. 1 illustrates a schematic structure of a radiant cooling structure 100 according to an embodiment of the present disclosure.

The radiant cooling structure 100 according to an embodi- ment of the present disclosure may perform a cooling function during the day as well as at night. The radiant cooling structure 100 may reflect sunlight, and may emit heat of an object O located inside or below the radiant cooling structure 100 to an external space in the form of electromagnetic waves.

The radiant cooling structure 100 may block light in a fifth band (e.g., the solar region) and emit heat in a fourth band, which is a part of a sixth band (e.g., the infrared region) having a longer wavelength than the fifth band, in order to achieve the cooling function. Specifically, since light and heat in the specific fourth band (e.g., the atmosphere window region) included in the sixth band are mostly transmitted, the radiant cooling structure 100 may reduce the temperature of the object O by radiating heat in the fourth band in other to achieve the cooling function.

The radiant cooling structure 100 according to an embodi- ment of the present disclosure is selectively high in emis- sivity only in the specific fourth band (e.g., a wavelength band corresponding to the atmosphere window), in which radiant heat can be emitted, in order for efficient passive radiant cooling. At the same time, the radiant cooling structure 100 has a low emissivity in a wavelength band other than the fourth band in order to prevent heat from being reabsorbed.

Referring to FIG. 1, the radiant cooling structure 100 according to an embodiment of the present disclosure includes a first functional layer 20 and a second functional layer 10 disposed adjacent to the first functional layer 20. The first functional layer 20 may be located more adjacent to the object O to be cooled than the second functional layer 10 is. For example, the second functional layer 10 may be disposed on the first functional layer 20, and the radiant cooling structure 100 may be disposed on the object O to be cooled, or may be disposed to surround the object O.

The first functional layer 20 may have a high emissivity in the fourth band relative to a band outside the fourth band (alternatively, in the fourth band, the first functional layer 20 may have an emissivity higher than that in a band outside the fourth band). The fourth band may be a band corresponding to the atmosphere window, for example, may correspond to 8 μm to 13 μm. However, this is merely an example, and in the present disclosure, the fourth band may include the above band, may be slightly narrower than or wider than the above band, or may slightly move from the above band, but the present disclosure is not limited thereto.

Since the first functional layer 20 has a high emissivity selectively in the fourth band, the first functional layer 20 may block radiant heat H1 absorbed from the atmosphere and emit heat H2 generated from the object O.

The second functional layer 10 is disposed on the first functional layer 20, and may have a high reflectivity in the fifth band corresponding to sunlight relative to a band outside the fifth band (alternatively, in the fifth band, the second functional layer 10 may have a reflectivity higher than that in a band outside the fifth band). Corresponding to sunlight means corresponding to a wavelength of the sun- light, and the fifth band corresponding to the sunlight may correspond to, for example, 0.3 μm to 2.5 μm. However, this is merely an example, and in the present disclosure, the fifth band may include the above band, may be slightly narrower than or wider than the above band, or may slightly move from the above band, but the present disclosure is not limited thereto. For example, the fifth band may correspond to 0.3 to 4 μm.

The second functional layer 10 may have a high trans- mittance in the sixth band having a longer wavelength than the fifth band relative to a band outside the sixth band. The sixth band may include the fourth band, for example, may be included in the infrared region. The sixth band may corre- spond to, for example, 4 μm to 20 μm, but the present disclosure is not limited thereto.

Since the second functional layer 10 has a high reflectivity in the fifth band, the second functional layer 10 may reflect or block sunlight L1. Since the second functional layer 10 is transparent to the sixth band having a longer wavelength than the fifth band, the second functional layer 10 allows the heats H1 and H2 emitted through the first functional layer 20 to be transmitted therethrough and discharged to the external space.

As a result, in the radiant cooling structure 100 according to an embodiment of the present disclosure, the sunlight L1 may be reflected by the second functional layer 10, and the heats H1 and H2 may be emitted by the first functional layer 20, thereby lowering the temperature of the object O than the temperature of the atmosphere.

Meanwhile, in the embodiments of the present disclosure, the second functional layer 10 may be implemented with various materials and structures.

Figure 2:
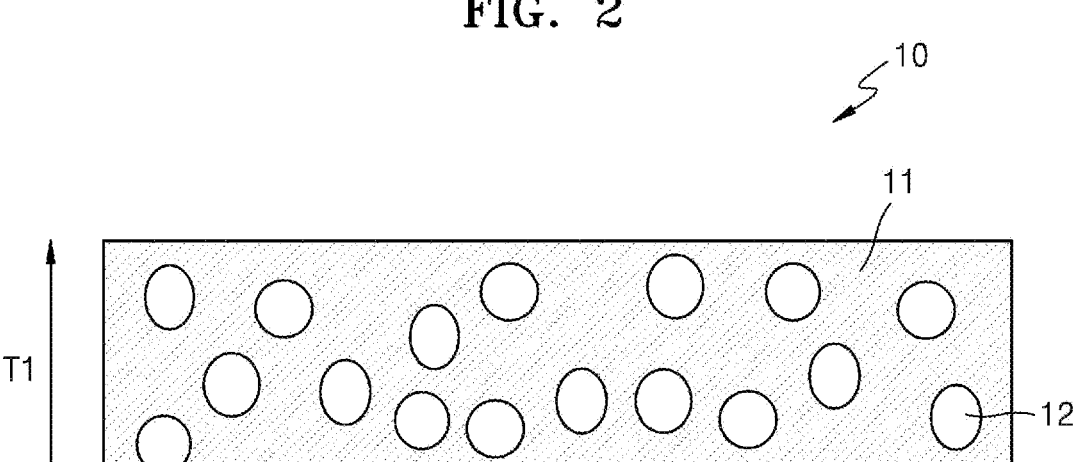
FIG. 2 illustrates a schematic structure of a second functional layer according to an embodiment of the present disclosure.

FIG. 2 illustrates a schematic structure of the second functional layer 10 according to an embodiment of the present disclosure.

Referring to FIG. 2, the second functional layer 10 may be formed of a material layer 11 that is transparent to at least infrared light, and the material layer 11, which is transparent to at least infrared light, may include a plurality of air voids 12. The material layer 11 transparent to at least infrared light may include, for example, at least one of polymer-based polyethylene and polypropylene, which are transparent to infrared light, and may be provided as a porous material layer. For example, when a polymer such as polyethylene or polypropylene has porosity, a high reflectivity may be achieved in the fifth band (e.g., the solar region) by a difference in refractive index between air and the polymer.

According to an embodiment, the material layer 11 transparent to infrared light may be formed of polyethylene. In this case, the second functional layer 10 may be porous polyethylene.

The polyethylene has a transparent property in the sixth band (e.g., the infrared region). Meanwhile, since the polyethylene is transparent even in the fifth band (e.g., the solar region), the polyethylene may include the plurality of air voids 12 to have a high solar reflectance. According to an embodiment, the more air voids the polyethylene includes, most of the sunlight (that is, light of the fifth band) may be reflected from a surface of the polyethylene. According to an embodiment, a thickness of the second functional layer 10, a size of the air void 12, and density of the air voids 12 may be optimized by experimentation or calculation.

According to an embodiment, the size (e.g., a diameter or radius) of the air void 12 may correspond to 2 μm. According to an embodiment, the density of the air voids 12 may correspond to $2 \times 10^{10}$ cm$^{-3}$. According to an embodiment, a thickness T1 of the second functional layer 10 may correspond to 0.1 to 1 mm.

However, the above numerical values are merely examples, and the present disclosure is not limited thereto.

Figure 3:
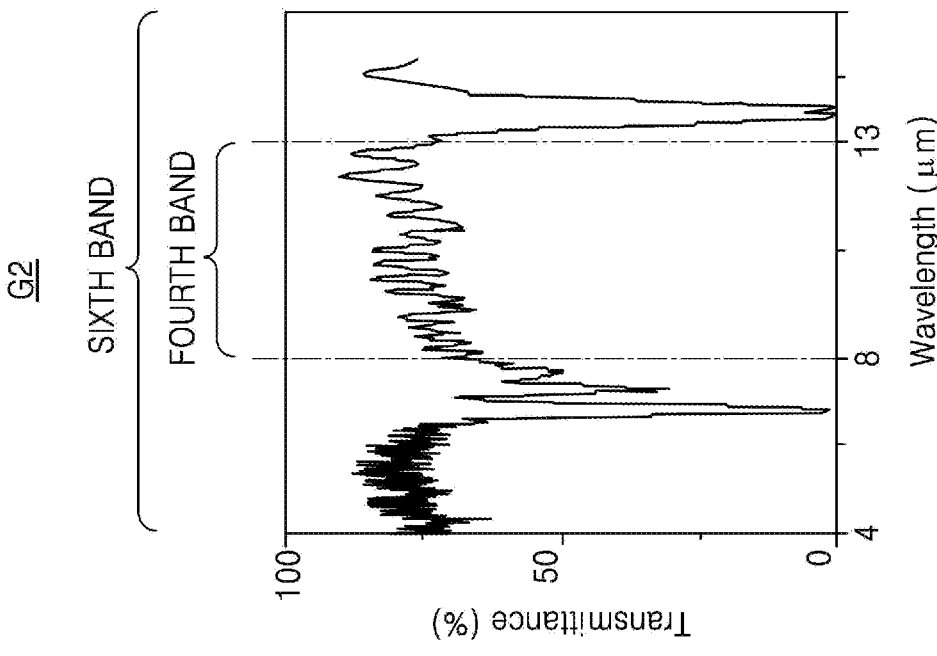
FIG. 3 illustrates optical characteristic graphs of the second functional layer when the second functional layer according to an embodiment of the present disclosure is porous polyethylene.
Figure 3:
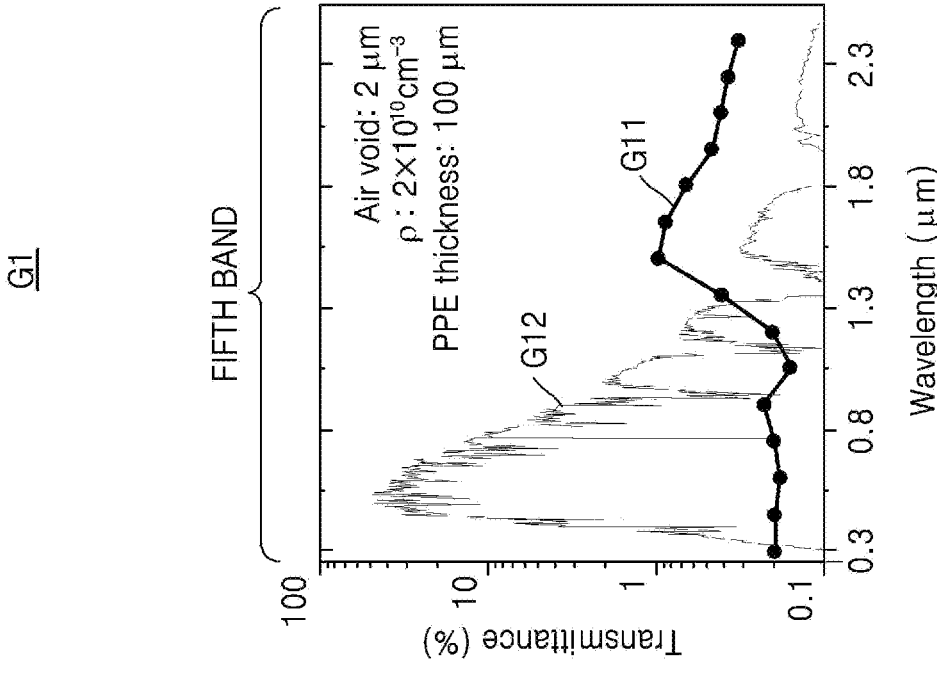

FIG. 3 illustrates optical characteristic graphs G1 and G2 of the second functional layer 10 when the second functional layer 10 according to an embodiment of the present disclosure is porous polyethylene.

The graph G1 shows a transmittance G11 and a solar spectrum G12 of the second functional layer 10 in a case in which the second functional layer 10 is formed of the porous polyethylene including the air voids 12, the diameter of the air void 12 is 2 μm, the density of the air voids 12 is $2 \times 10^{10}$ cm$^{-3}$, and the thickness T1 of the second functional layer 10 is 0.1 mm. A horizontal axis of the graph G1 may correspond to the fifth band (e.g., 0.3 μm to 2.5 μm) corresponding to the solar spectrum.

Referring to the graph G1, the second functional layer 10 configured as described above has a transmittance of less than 1% in a band (e.g., the fifth band) corresponding to the solar spectrum, and accordingly, may have a very high reflectivity of 98% or more.

Referring to the graph G2, the second functional layer 10 configured as described above has a high transmittance in the sixth band having a longer wavelength than the fifth band, and thus the second functional layer 10 may be transparent to the sixth band. In the graph G2, the second functional layer 10 shows a transmittance of 80% or more in the sixth band (e.g., 4 μm to 20 μm) including the fourth band.

According to an embodiment of the present disclosure, the first functional layer 20 may include a resonant layer that resonates with respect to at least the fourth band. The first functional layer 20 may radiate light of the fourth band by resonating with the light of the fourth band. The structure of the first functional layer (or the structure of the resonant layer) according thereto is not limited.

According to an embodiment, the first functional layer 20 may have a structure in which a first-third functional layer is interposed between a first-first functional layer and a first-second functional layer. Each of the first-first functional layer and the first-second functional layer may be formed of a material having a higher light reflectance than the first-third functional layer, and may be provided as a metal of a thin film to form a semi-transmissive reflection layer. The first-first functional layer and the first-second functional layer may each include at least one material selected from among silver (Ag), magnesium (Mg), aluminum (Al), gold (Au), and germanium (Ge), but do not necessarily have to be made of the same material, and may have different thicknesses. The first-third functional layer may be formed of a material having a higher light transmittance than the first-first functional layer and/or the first-second functional layer. The first-third functional layer may have a structure in which a plurality of transparent layers having different refractive indexes are alternately stacked. The first-third functional layer may include silicon oxide, silicon nitride, silicon oxynitride, aluminum oxide, aluminum nitride, or aluminum oxynitride.

According to an optional embodiment of this structure, a light resonance effect may occur due to the first-third functional layer.

Figure 4:
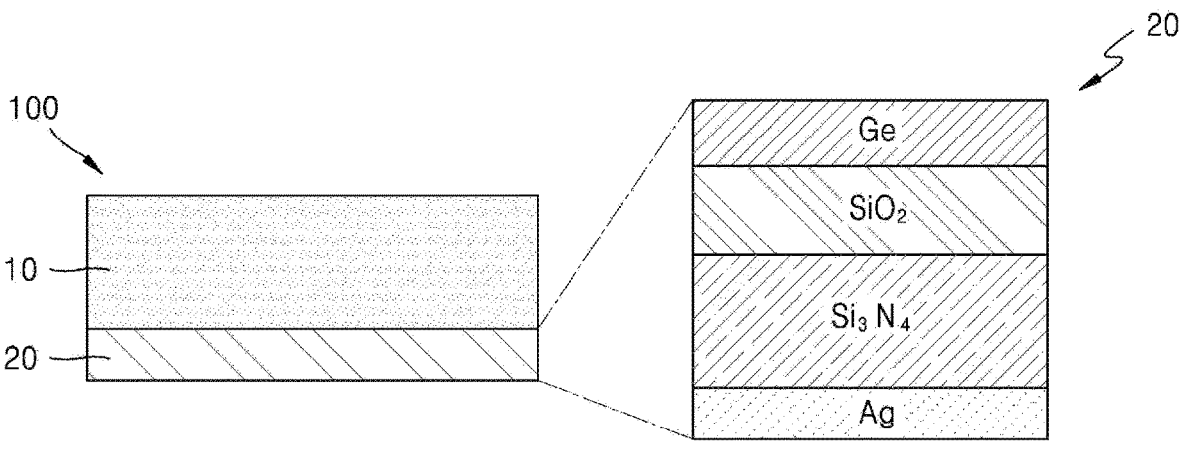
FIG. 4 illustrates a schematic structure of a first functional layer according to an embodiment of the present disclosure.
Figure 5:
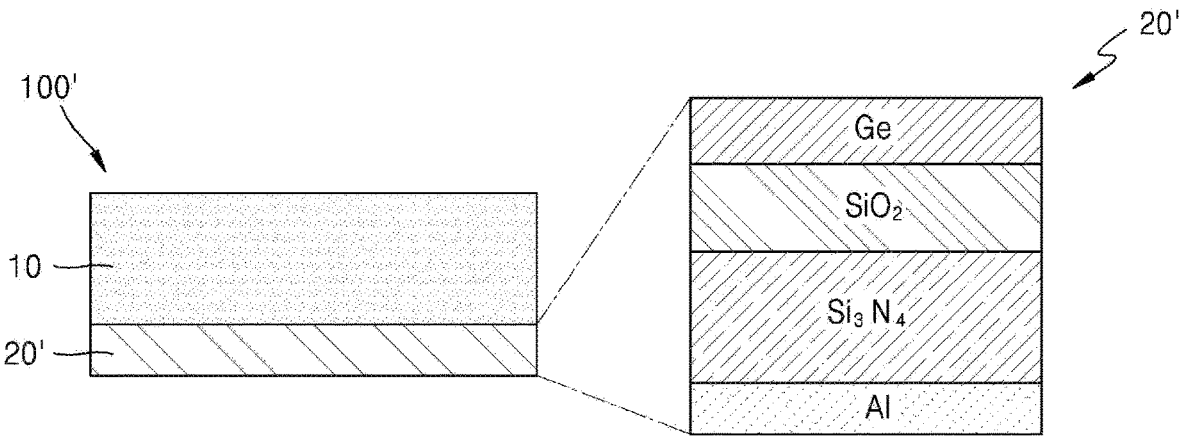
FIG. 5 illustrates a schematic structure of a first functional layer according to another embodiment of the present disclosure.

FIG. 4 illustrates a schematic structure of the first functional layer 20 according to an embodiment of the present disclosure. FIG. 5 illustrates a schematic structure of a first functional layer 20' according to another embodiment of the present disclosure.

Referring to FIGS. 4 and 5, in the embodiments of the present disclosure, each of the first functional layers 20 and 20' may include a Ge layer at an uppermost portion thereof. According to an embodiment, each of the first functional layers 20 and 20' may be formed by depositing Ge on an uppermost portion of any selective emissive structure. The first functional layers 20 and 20' may be thin-film structures.

Referring to FIG. 4, the first functional layer 20 according to an embodiment of the present disclosure may be formed by including an Ag substrate, stacking a silicon nitride (Si$_3$N$_4$) layer on an upper portion of the Ag substrate, stacking a silicon oxide (SiO$_2$) layer on an upper portion of the Si$_3$N$_4$ layer, and depositing a Ge layer on an upper portion of the SiO$_2$ layer. For example, a thickness of the Ag substrate may correspond to 100 nm, a thickness of the Si$_3$N$_4$ layer may correspond to 650 nm, a thickness of the SiO$_2$ layer may correspond to 280 nm, and a thickness of the Ge layer may correspond to 125 nm. Thus, the first functional layer 20 may be a thin-film structure composed of Ag, Si$_3$N$_4$, SiO$_2$, and Ge. However, the present disclosure is not limited thereto.

Referring to FIG. 5, the first functional layer 20' of a radiant cooling structure 100' according to another embodiment of the present disclosure may be formed by including an Al substrate, stacking a Si$_3$N$_4$ layer on an upper portion of the Al substrate, stacking a SiO$_2$ layer on an upper portion of the Si$_3$N$_4$ layer, and depositing a Ge layer on an upper portion of the SiO$_2$ layer. For example, a thickness of the Al substrate may correspond to 30 nm, a thickness of the Si$_3$N$_4$ layer may correspond to 650 nm, a thickness of the SiO$_2$ layer may correspond to 280 nm, and a thickness of the Ge layer may correspond to 125 nm. However, the present disclosure is not limited thereto.

According to various embodiments of the present disclosure, the first functional layer 20 may be formed without a complicated process such as patterning, and there is an advantage in that the first functional layer 20 is easily formed in a large area.

According to an embodiment, the first functional layer 20 may include a reflection layer that is reflective with respect to the fifth band.

Meanwhile, the first functional layer 20 according to various embodiments of the present disclosure is not limited to the above description. According to an optional embodiment of the present disclosure, the first functional layer 20 may be formed as a diffractive structure in which diffracted light is trapped in the structure of the first functional layer 20 to improve emissivity. For example, by adjusting the shape and size of the structure (e.g., the shape and size of a pattern) of the first functional layer 20, diffraction of light of the fourth band may be generated, and the diffracted light may be trapped in the structure of the first functional layer 20. According to this embodiment, the first functional layer 20 may be a diffractive structure such as a two-dimensional (2D) structure or photonic crystal structure. Alternatively, the first functional layer 20 may include a polymer having a high absorption rate selectively in the fourth band, or may be composed of the polymer. However, the present disclosure is not limited thereto.

Figure 6:
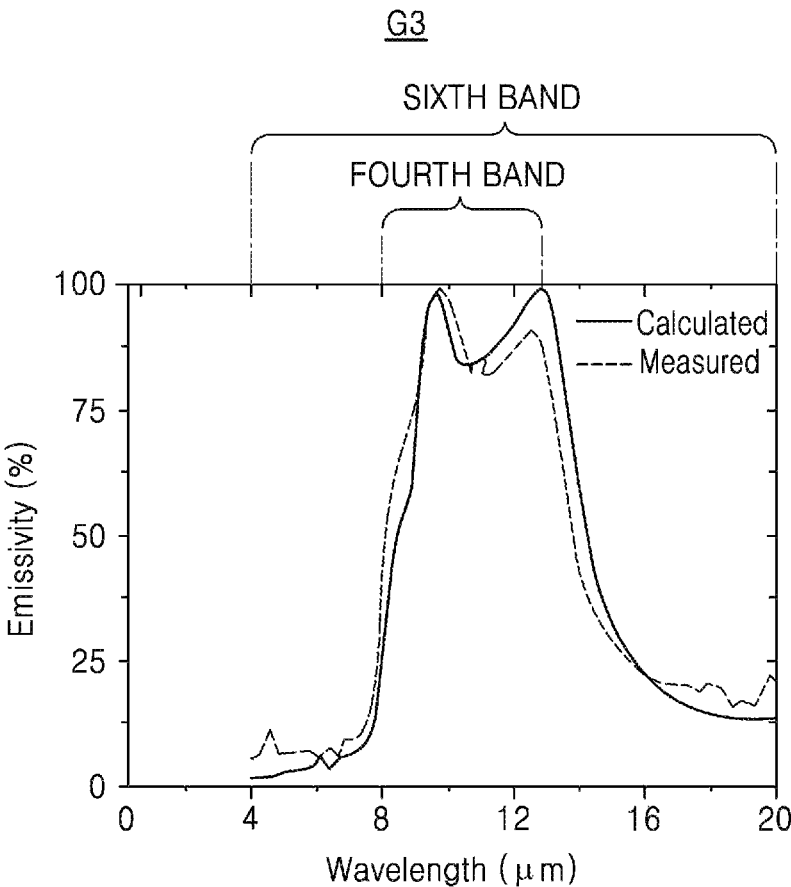
FIG. 6 illustrates a graph showing an emissivity of the first functional layer according to an embodiment of the present disclosure.

FIG. 6 illustrates a graph G3 showing an emissivity of the first functional layer 20 according to an embodiment of the present disclosure.

Referring to FIG. 6, the emissivity graph G3 shows calculated and measured values for the emissivity of the first functional layer 20 (the first functional layer 20 of FIG. 4) in which Ag, $Si_3N_4$, $SiO_2$, and Ge are stacked to thicknesses of 100 nm, 650 nm, 280 nm, and 125 nm, respectively.

Referring to the graph G3, the first functional layer 20 has a high emissivity selectively in the fourth band (for example, 8 µm to 13 µm) corresponding to the atmosphere window. That is, the first functional layer 20 may have a high emissivity in the fourth band relative to a band outside the fourth band.

Referring to the graphs G1, G2, and G3 together, the second functional layer 10 has a high reflectivity in the fifth band corresponding to sunlight to block the sunlight, and has a high transmittance in the sixth band corresponding to the infrared region to allow the heats H1 and H2 emitted from the first functional layer 20 to be transmitted therethrough and discharged to an external space. In addition, the first functional layer 20 has a high emissivity selectively in the fourth band corresponding to the mid-infrared region, and thus may block the radiant heat H1 absorbed from the air and emit the heat H2 generated from the object O.

As a result of comparing the first functional layer 20 according to an embodiment of the present disclosure with a broadband emitter (BE) having characteristics of high emissivity in a broadband region of 4 µm or more, the first functional layer 20 according to an embodiment of the present disclosure showed higher cooling efficiency in both dry and humid climates than the broadband emitter BE. That is, it was confirmed that the first functional layer 20 according to an embodiment of the present disclosure has better cooling performance in any climate as compared to the broadband emitter (BE).

Figure 7:
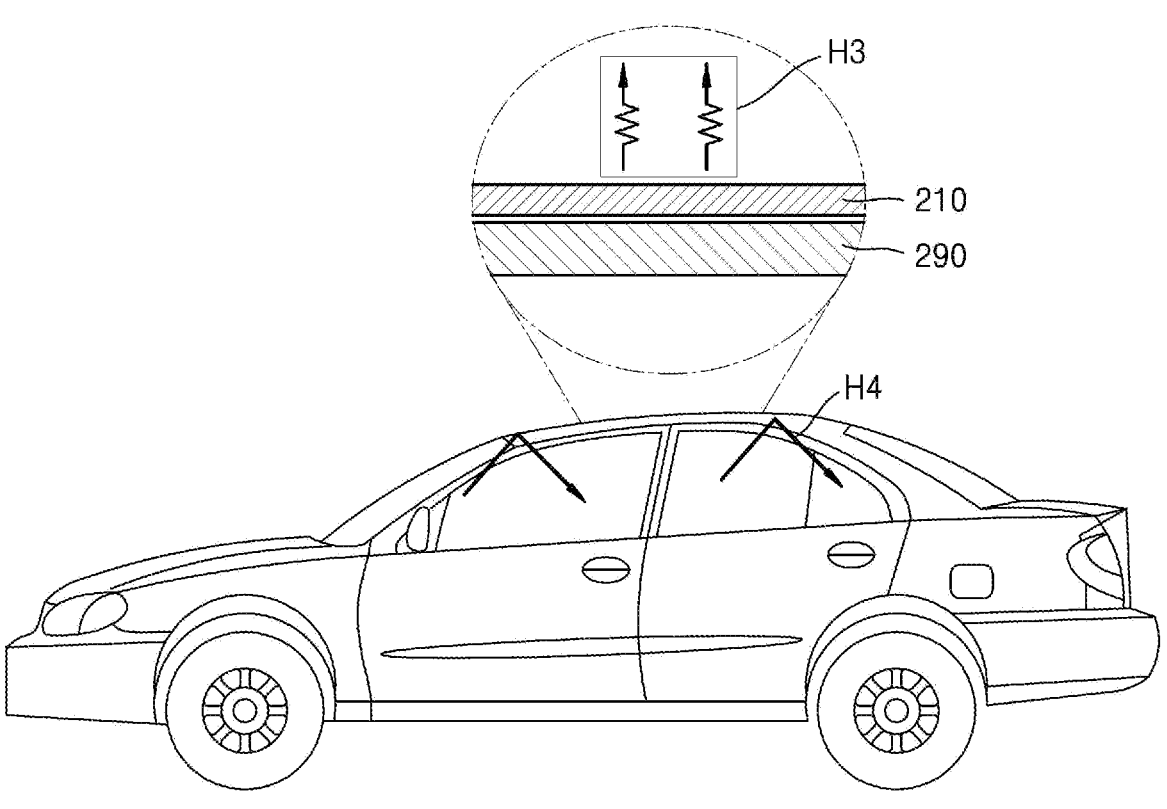
FIG. 7 illustrates a general sunroof system for a vehicle.

FIG. 7 illustrates a general sunroof system for a vehicle.

Referring to FIG. 7, the general sunroof system for a vehicle includes a sunroof glass 210, and a sunshade 290 disposed below the sunroof glass 210 to block light introduced through the sunroof glass 210.

The general sunroof system does not emit heat H4 generated inside the vehicle to the outside. That is, the general sunroof system reflects the infrared heat H4 to the inside of the vehicle, and thus the temperature inside the vehicle rises.

Figure 8:
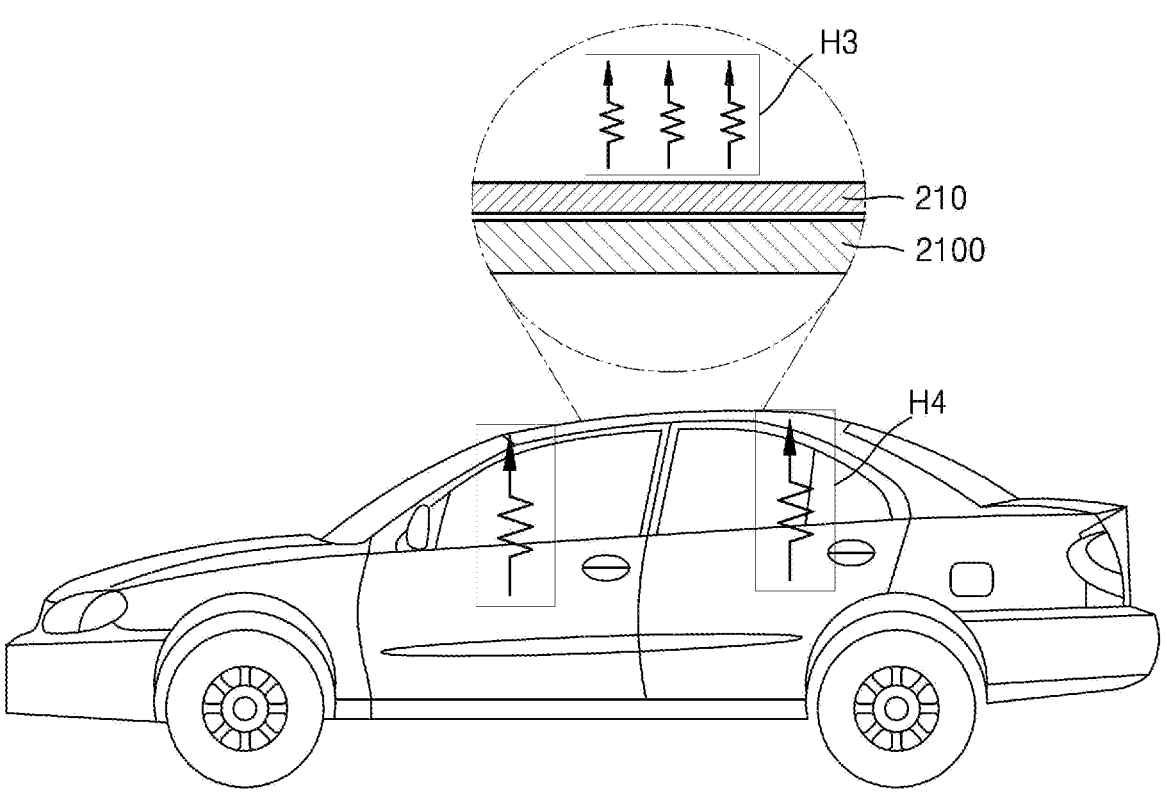
FIG. 8 illustrates a schematic structure of a sunroof system for a vehicle according to an embodiment of the present disclosure.

FIG. 8 illustrates a schematic structure of a sunroof system for a vehicle according to an embodiment of the present disclosure.

Referring to FIG. 8, the sunroof system for a vehicle according to an embodiment of the present disclosure includes glass 210 and a passive radiant cooling layer 2100. The passive radiant cooling layer 2100 may be disposed, for example, below the glass 210. For example, the passive radiant cooling layer 2100 and the glass 210 may be slid in a vehicle body. For example, the passive radiant cooling layer 2100 and the glass 210 may be installed to be spaced apart from each other, and may be independently slidingly controlled. However, the present disclosure is not limited thereto.

Although not shown in the drawing, a sunroof system for a vehicle according to another embodiment of the present disclosure may further include a sunshade (e.g., 290) in addition to the glass 210 and the passive radiant cooling layer 2100. For example, the sunshade may be disposed below the passive radiant cooling layer 2100. The sunroof system for a vehicle according to various embodiments of the present disclosure may selectively include the sunshade.

Referring to FIG. 8 again, the sunroof system for a vehicle according to an embodiment of the present disclosure may emit heat H4 generated inside the vehicle to the outside due to the presence of the passive radiant cooling layer 2100. For example, the passive radiant cooling layer 2100 may absorb the infrared heat H4, and emit, i.e., radiate, the infrared heat H4 to the outside of the vehicle. In addition, the passive radiant cooling layer 2100 may block radiant heat H3 absorbed from the atmosphere, and emit the radiant heat H3 to lower the temperature inside the vehicle than the temperature of the atmosphere.

Meanwhile, the passive radiant cooling layer 2100 of the sunroof system according to various embodiments of the present disclosure may include at least one or more layers selected from a first emission layer 2110, a second emission layer 2120, and a reflection layer 2130.

The first emission layer 2110 is a layer having a high emissivity in a first band relative to a band outside the first band. In other words, in the first emission layer 2110, radiant energy of wavelengths in the first band is radiated at an emissivity higher than that of radiant energy of the remaining wavelengths except for the wavelengths of the first band.

The second emission layer 2120 is a layer having a high emissivity in a second band relative to a band outside the second band. In other words, in the second emission layer 2120, radiant energy of wavelengths in the second band is radiated at an emissivity higher than that of radiant energy of the remaining wavelengths except for the wavelengths of the second band.

The second band is included in the first band and is in a narrower wavelength range than the first band. The first band may correspond to the infrared region, and the second band may correspond to the mid-infrared region. The second band may be, for example, a wavelength band corresponding to the atmosphere window.

For example, the first band may be in a range of 4 µm to 20 µm. However, the present disclosure is not limited thereto, and for example, the first band may be in a range of 4 μm to 25 μm. For example, the second band may correspond to 8 μm to 13 μm, but the present disclosure is not limited thereto.

The second emission layer 2120 is a selective emitter (SE) having a high emissivity selectively in the second band. The second emission layer 2120 has a low emission rate (absorption rate) in a wavelength band other than the second band in order to prevent heat from being reabsorbed.

The first emission layer 2110 is a broadband emitter (BE) having a high emissivity in the first band wider than the second band.

Meanwhile, the reflection layer 2130 may have a high reflectivity in a third band having a shorter wavelength than the first band relative to a band outside the third band (alternatively, in the third band, the reflection layer 2130 may have a reflectivity higher than that in a band outside the third band).

For example, the third band may correspond to a wavelength of sunlight. For example, the third band may correspond to 0.3 μm to 2.5 μm. However, this is merely an example, and in the present disclosure, each of the first, second, and third bands may include the above band, may be slightly narrower than or wider than the above band, or may slightly move from the above band, but the present disclosure is not limited thereto. For example, the third band may be in a range of 0.28 μm to 4 μm.

The passive radiant cooling layer 2100 of the sunroof system according to various embodiments of the present disclosure may include at least one or more layers selected from the first emission layer 2110, the second emission layer 2120, and the reflection layer 2130. Various embodiments of the passive radiant cooling layer 2100 of the sunroof system according to the present disclosure will be described in detail below with reference to FIGS. 9 to 16.

The descriptions of the various above-described embodiments of the present disclosure may be applied to all of the various embodiments below.

Figure 9:
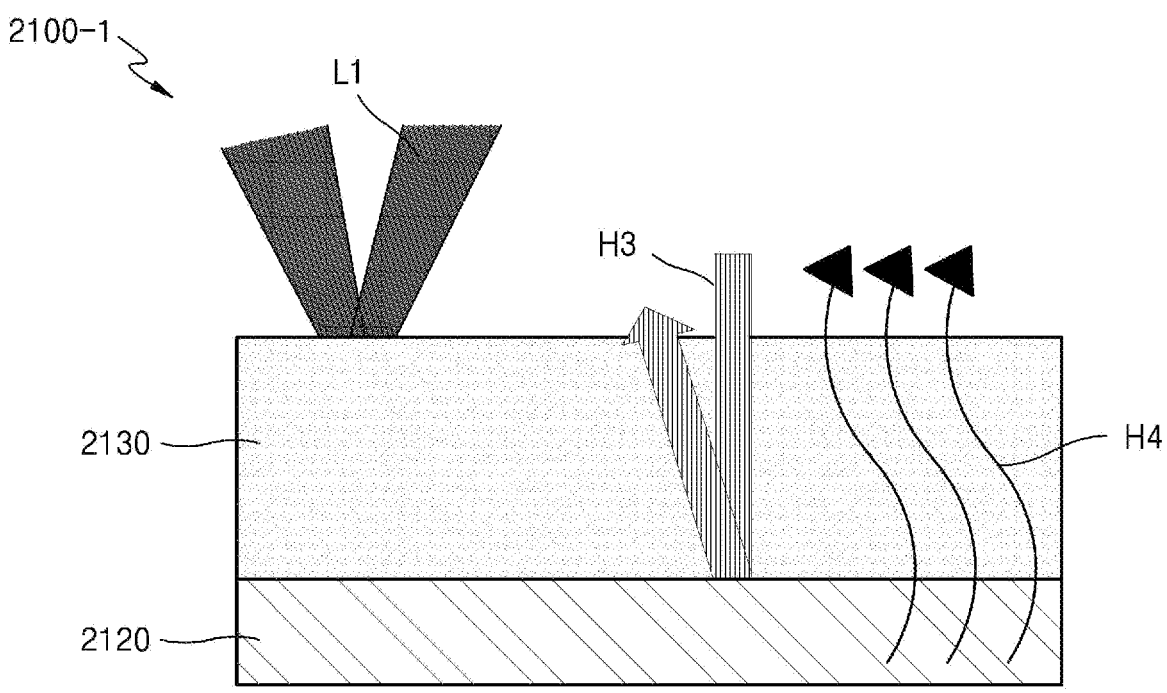
FIG. 9 illustrates a schematic structure of a passive radiant cooling layer included in a sunroof system according to a first embodiment of the present disclosure.

FIG. 9 illustrates a schematic structure of a passive radiant cooling layer 2100-1 included in a sunroof system according to a first embodiment of the present disclosure.

The passive radiant cooling layer 2100-1 according to the first embodiment may include a second emission layer 2120 and a reflection layer 2130. The second emission layer 2120 may be located more adjacent to an inside of a vehicle than the reflection layer 2130 is. For example, the reflection layer 2130 may be disposed on the second emission layer 2120.

The reflection layer 2130 may have a high transmittance in a first band (for example, the infrared region) having a longer wavelength than a third band (for example, the solar region) relative to a band outside the first band. The first band is a wide band including a second band.

Since the reflection layer 2130 has a high reflectivity in the third band, the reflection layer 2130 may reflect or block sunlight L1. Since the reflection layer 2130 is transparent to the first band having a longer wavelength than the third band, heats H3 and H4 emitted through the second emission layer 2120 are transmitted through the reflection layer 2130 and discharged to the external space.

As a result, in the passive radiant cooling layer 2100-1 according to the first embodiment, the sunlight L1 may be reflected by the reflection layer 2130, and the heats H3 and H4 may be emitted by the second emission layer 2120, thereby lowering the temperature inside the vehicle than the temperature of the atmosphere. Meanwhile, in the first embodiment, the reflection layer 2130 may be implemented with various materials and structures.

Figure 10:
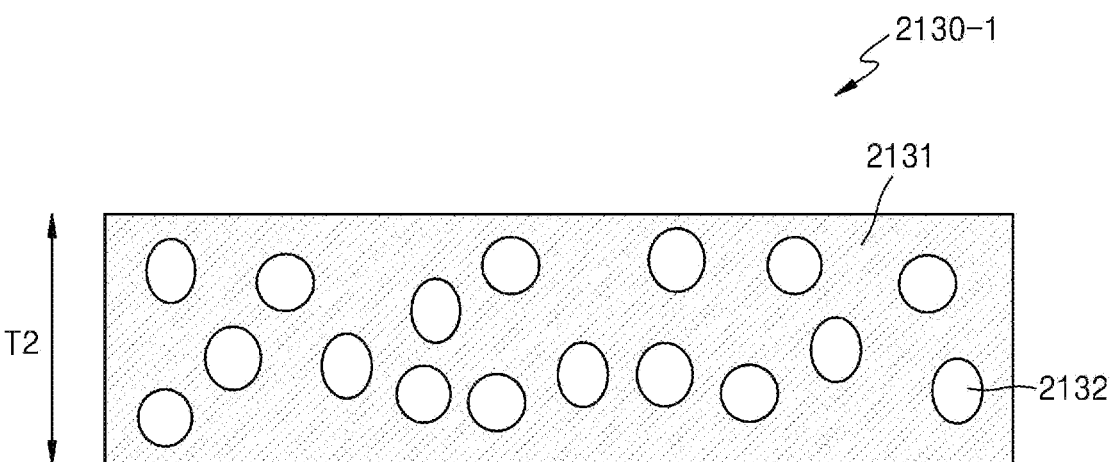
FIG. 10 illustrates a schematic structure of a reflection layer according to an example of the first embodiment.

FIG. 10 illustrates a schematic structure of a reflection layer 2130-1 according to an example of the first embodiment.

Referring to FIG. 10, the reflection layer 2130-1 may include a material layer 2131 that is transparent to at least infrared light, and the material layer 2131 that is transparent to at least infrared light may include a plurality of air voids 2132. The material layer 2131 transparent to at least infrared light may include, for example, at least one of polymer-based polyethylene and polypropylene, which are transparent to infrared light, and may be provided as a porous material layer.

According to an embodiment, the material layer 2131 transparent to infrared light may be formed of polyethylene. In this case, the reflection layer 2130-1 may be porous polyethylene.

The polyethylene has a transparent property in the first band (e.g., the infrared region). Meanwhile, since the polyethylene is transparent even in the third band (e.g., the solar region), the polyethylene may include the plurality of air voids 2132 to have a high solar reflectance. According to an embodiment, the more air voids the polyethylene includes most of the sunlight (that is, light of the third band) may be reflected from a surface of the polyethylene. According to an embodiment, a thickness of the reflection layer 2130-1, a size of the air void 2132, and density of the air voids 2132 may be optimized by experiments or calculations.

According to an embodiment, the size (e.g., a diameter or radius) of the air void 2132 may correspond to 2 μm. According to an embodiment, the density of the air voids 2132 may correspond to $2 \times 10^{10}$ cm$^{-3}$. According to an embodiment, a thickness T2 of the reflection layer 2130-1 may correspond to 0.1 to 1 mm.

However, the above numerical values are merely examples, and the present disclosure is not limited thereto.

Figure 11:
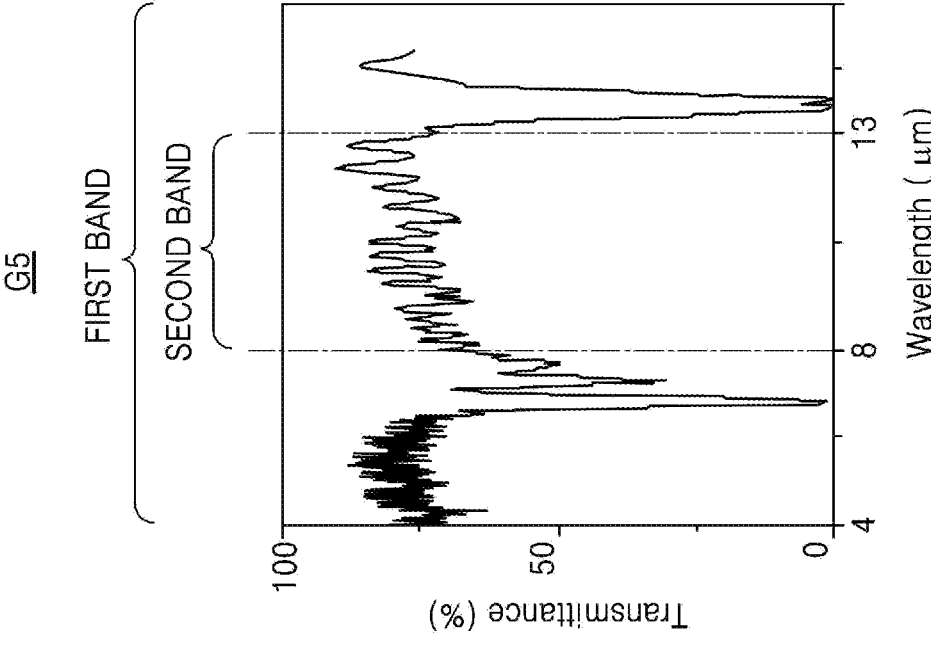
FIG. 11 illustrates optical characteristic graphs of the reflection layer when the reflection layer is porous polyethylene, in an example of the first embodiment.
Figure 11:
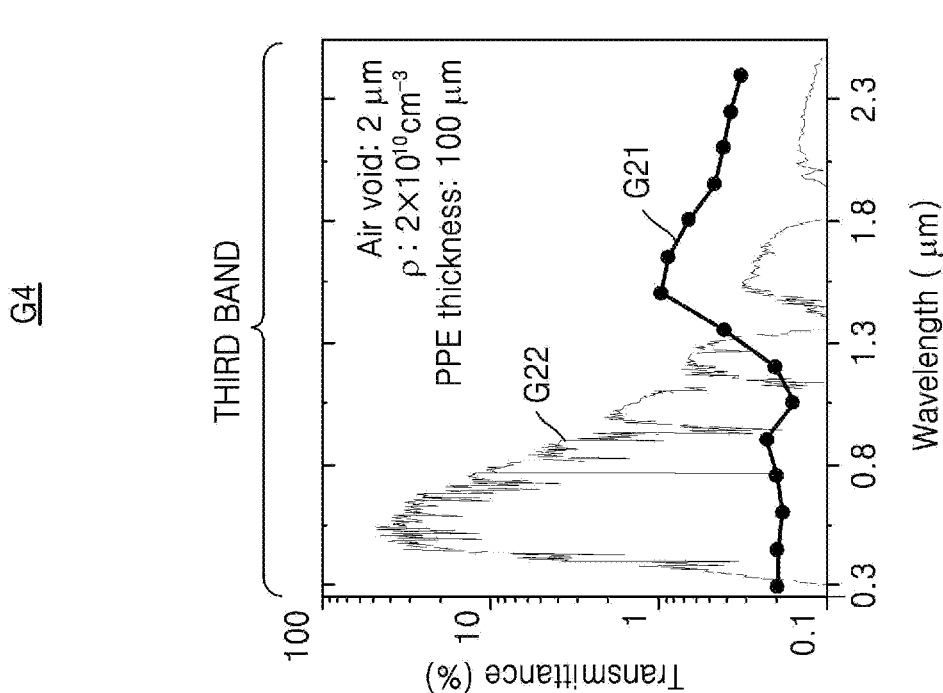

FIG. 11 illustrates optical characteristic graphs G4 and G5 of the reflection layer 2130-1 when the reflection layer 2130-1 is porous polyethylene, in an example of the first embodiment.

The graph G4 shows a transmittance G21 and a solar spectrum G22 of the reflection layer 2130-1 in a case in which the reflection layer 2130-1 is formed of the porous polyethylene including the air voids 2132, the diameter of the air void 2132 is 2 μm, the density of the air voids 2132 is $2 \times 10^{10}$ cm$^{-3}$, and the thickness T2 of the reflection layer 2130-1 is 0.1 mm. A horizontal axis of the graph G4 may correspond to the third band corresponding to the solar spectrum.

Referring to the graph G4, the reflection layer 2130-1 configured as described above has a transmittance of less than 1% in a band (e.g., the third band) corresponding to the solar spectrum, and accordingly, may have a very high reflectivity of 98% or more.

Referring to the graph G5, the reflection layer 2130-1 configured as described above has a high transmittance in the first band having a longer wavelength than the third band, and thus the reflection layer 2130-1 may be transparent to the first band. In the graph G5, the reflection layer 2130-1 shows a transmittance of 80% or more in the first band including the second band.

Figure 12:
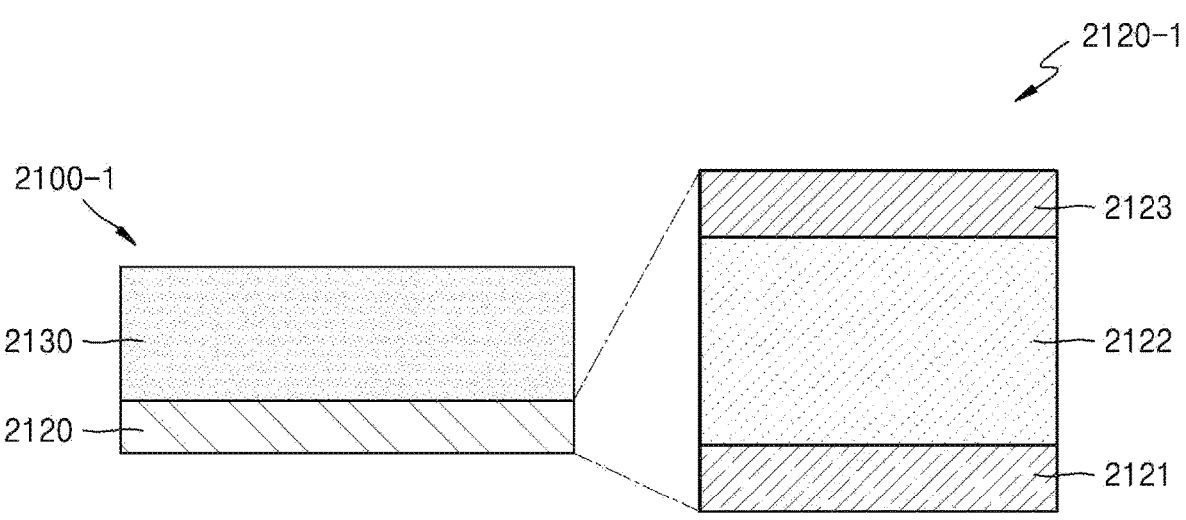
FIG. 12 illustrates a schematic structure of a second emission layer according to an example of the first embodiment.

FIG. 12 illustrates a schematic structure of a second emission layer 2120-1 according to an example of the first embodiment.

The second emission layer 2120 of the passive radiant cooling layer 2100-1 according to the first embodiment may be the same as, for example, the second emission layer 2120-1. According to an embodiment, the second emission layer 2120-1 may include a resonant layer (e.g., a second functional layer 2122) that resonates with respect to at least the second band. The second emission layer 2120-1 may radiate light of the second band by resonating with the light of the second band. The structure of the second emission layer 2120-1 (or the structure of the resonant layer) according thereto is not limited.

According to an embodiment, the second emission layer 2120-1 may have a structure in which the second functional layer 2122 is interposed between a first functional layer 2121 and a third functional layer 2123. Each of the first functional layer 2121 and the third functional layer 2123 may be formed of a material having a higher light reflectance than the second functional layer 2122, and may be provided as a metal of a thin film to form a semi-transmissive reflection layer. The first functional layer 2121 and the third functional layer 2123 may each include at least one material selected from among Ag, Mg, Al, Au, and Ge, but do not necessarily have to be made of the same material, and may have different thicknesses. The second functional layer 2122 may be formed of a material having a higher light transmittance than the first functional layer 2121 and/or the third functional layer 2123. The second functional layer 2122 may have a structure in which a plurality of transparent layers having different refractive indexes are alternately stacked. The second functional layer 2122 may include silicon oxide, silicon nitride, silicon oxynitride, aluminum oxide, aluminum nitride, or aluminum oxynitride.

According to an optional embodiment of this structure, a light resonance effect may occur due to the second functional layer 2122.

Figure 13:
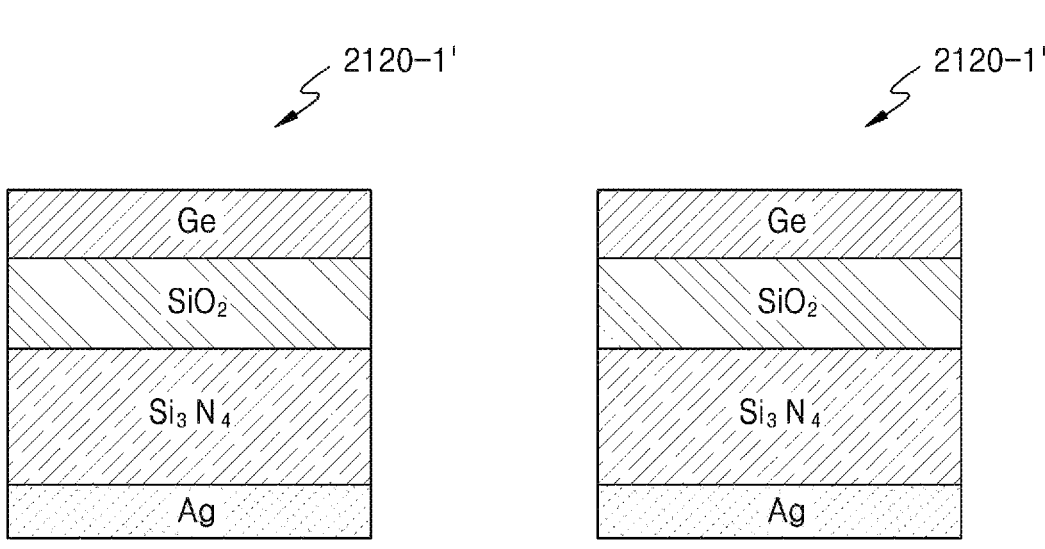
FIG. 13 illustrates exemplary structures of a second emission layer according to an example of the first embodiment.

FIG. 13 illustrates exemplary structures of the second emission layer 2120-1 according to an example of the first embodiment.

Referring to FIG. 13, in the first embodiment, each of second emission layers 2120-1' and 2120-1" may include a Ge layer at an uppermost portion thereof. According to an embodiment, each of the second emission layers 2120-1' and 2120-1" may be formed by depositing Ge on an uppermost portion of any selective emissive structure. The second emission layer 2120-1' and 2120-1" may each be a thin-film structure.

The second emission layer 2120-1' according to an example of the first embodiment may be formed by including an Ag substrate, stacking a $Si_3N_4$ layer on an upper portion of the Ag substrate, stacking a $SiO_2$ layer on an upper portion of the $Si_3N_4$ layer, and depositing a Ge layer on an upper portion of the $SiO_2$ layer. For example, a thickness of the Ag substrate may correspond to 100 nm, a thickness of the $Si_3N_4$ layer may correspond to 650 nm, a thickness of the $SiO_2$ layer may correspond to 280 nm, and a thickness of the Ge layer may correspond to 125 nm. Accordingly, the second emission layer 2120-1' according to an example of the first embodiment may be a thin-film structure composed of Ag, $Si_3N_4$, $SiO_2$, and Ge. However, the present disclosure is not limited thereto.

The second emission layer 2120-1" according to another example of the first embodiment may be formed by including an Al substrate, stacking a $Si_3N_4$ layer on an upper portion of the Al substrate, stacking a $SiO_2$ layer on an upper portion of the $Si_3N_4$ layer, and depositing a Ge layer on an upper portion of the $SiO_2$ layer. For example, a thickness of the Al substrate may correspond to 30 nm, a thickness of the $Si_3N_4$ layer may correspond to 650 nm, a thickness of the $SiO_2$ layer may correspond to 280 nm, and a thickness of the Ge layer may correspond to 125 nm. However, the present disclosure is not limited thereto.

According to the first embodiment of the present disclosure, the second emission layer 2120 may be formed without a complicated process such as patterning, and there is an advantage in that the second emission layer 2120 is easily formed in a large area.

According to an embodiment, the second emission layer 2120 may include a reflection layer that is reflective with respect to the second band.

Figure 14:
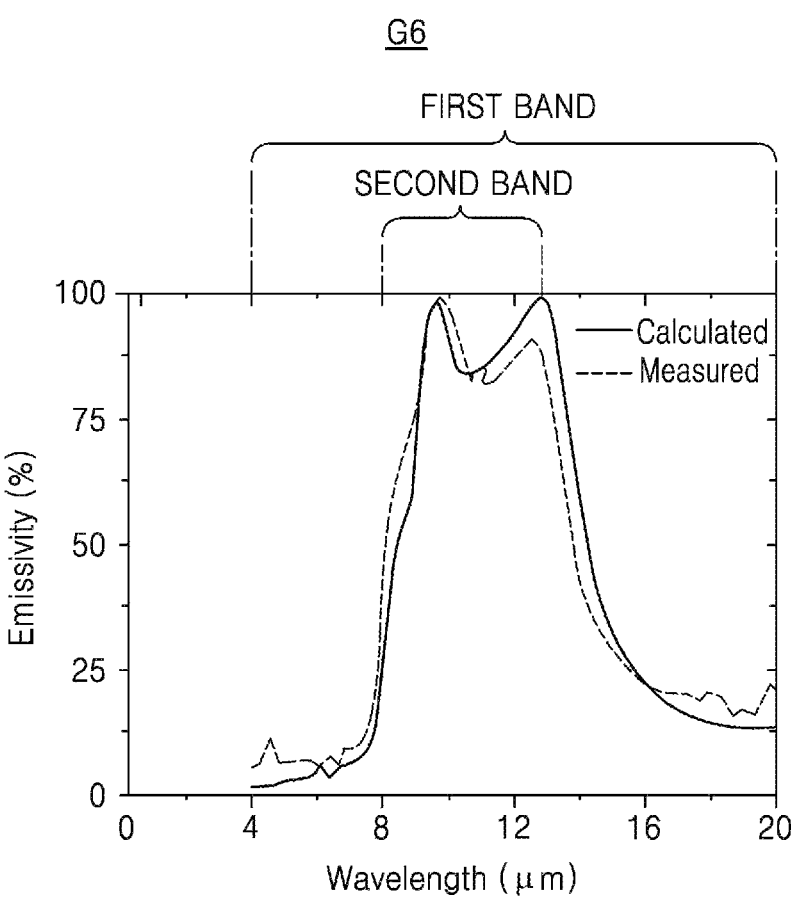
FIG. 14 illustrates a graph showing an emissivity of the second emission layer, in an example of the first embodiment.

FIG. 14 illustrates a graph G6 showing an emissivity of the second emission layer 2120-1', in an example of the first embodiment.

Referring to FIG. 14, the emissivity graph G6 shows calculated and measured values for the emissivity of the second emission layer 2120-1' in which Ag, $Si_3N_4$, $SiO_2$, and Ge are stacked to thicknesses of 100 nm, 650 nm, 280 nm, and 125 nm, respectively.

Referring to the graph G6, the second emission layer 2120-1' has a high emissivity selectively in the second band (for example, 8 μm to 13 μm) corresponding to the atmosphere window. That is, the second emission layer 2120-1' may have a high emissivity in the second band relative to a band outside the second band.

Referring to the graphs G4, G5, and G6 together, each of the reflection layers 2130 and 2130-1 has a high reflectivity in the third band corresponding to sunlight to block the sunlight, and has a high transmittance in the first band corresponding to the infrared region to allow the heats H3 and H4 emitted from the second emission layers 2120 and 2120-1 to be transmitted therethrough and discharged to an external space. In addition, the second emission layers 2120 and 2120-1 have a high emissivity selectively in the second band corresponding to the mid-infrared region, and thus may block radiant heat H3 absorbed from the air and emit heat H4 generated from the inside of the vehicle.

Meanwhile, in various embodiments of the present disclosure, the second emission layer 2120 is not limited to the above-described second emission layers 2120-1, 2120-1', and 2120-1". According to an optional embodiment of the present disclosure, the second emission layer 2120 may be formed as a diffractive structure in which diffracted light is trapped in the structure of the second emission layer 2120 to improve emissivity. For example, by adjusting the shape and size of the structure (e.g., the shape and size of a pattern) of the second emission layer 2120, diffraction of light of the second band may be generated, and the diffracted light may be trapped in the structure of the second emission layer 2120. According to this embodiment, the second emission layer 2120 may be a diffractive structure such as a 2D structure or photonic crystal structure. Alternatively, the second emission layer 2120 may include a polymer having a high absorption rate selectively in the second band, or may be composed of the polymer. However, the present disclosure is not limited thereto.

Figure 15:
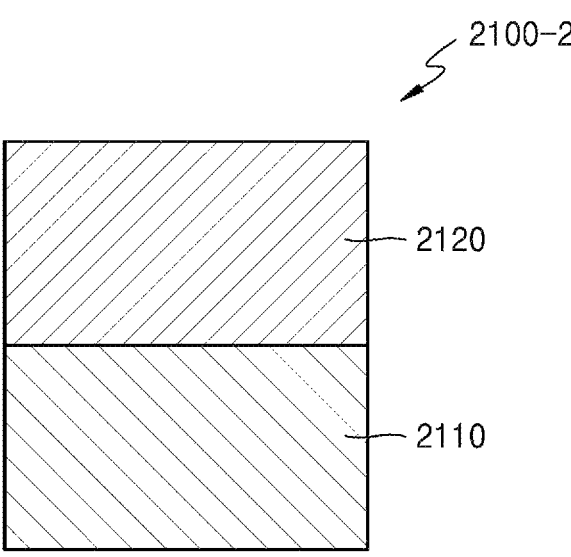
FIG. 15 illustrates a schematic structure of a passive radiant cooling layer included in a sunroof system according to a second embodiment of the present disclosure.

FIG. 15 illustrates a schematic structure of a passive radiant cooling layer 2100-2 included in a sunroof system according to a second embodiment of the present disclosure.

The passive radiant cooling layer 2100-2 according to the second embodiment may include a second emission layer 2120 having a high emissivity in a second band relative to a band outside the second band, and a first emission layer 2110 provided below the second emission layer 2120 and having a high emissivity in a first band, which includes the second band and is wider than the second band, relative to a band outside the first band. The first emission layer 2110 may be located more adjacent to an inside of a vehicle than the second emission layer 2120 is. The passive radiant cooling layer 2100-2 as described above may have characteristics of both a selective emitter and a broadband emitter.

The passive radiant cooling layer 2100-2 according to the second embodiment as described above may have the Janus characteristic in which upper and lower surfaces have different heat radiation characteristics. Specifically, in the passive radiant cooling layer 2100-2 according to the second embodiment, a surface in contact with the inside of the vehicle has an emission characteristic (emissivity) in which radiant energy is high in a relatively wide wavelength range, and a surface in contact with the outside of the vehicle has an emission characteristic in which the radiant energy is high in a relatively narrow wavelength range.

Figure 16:
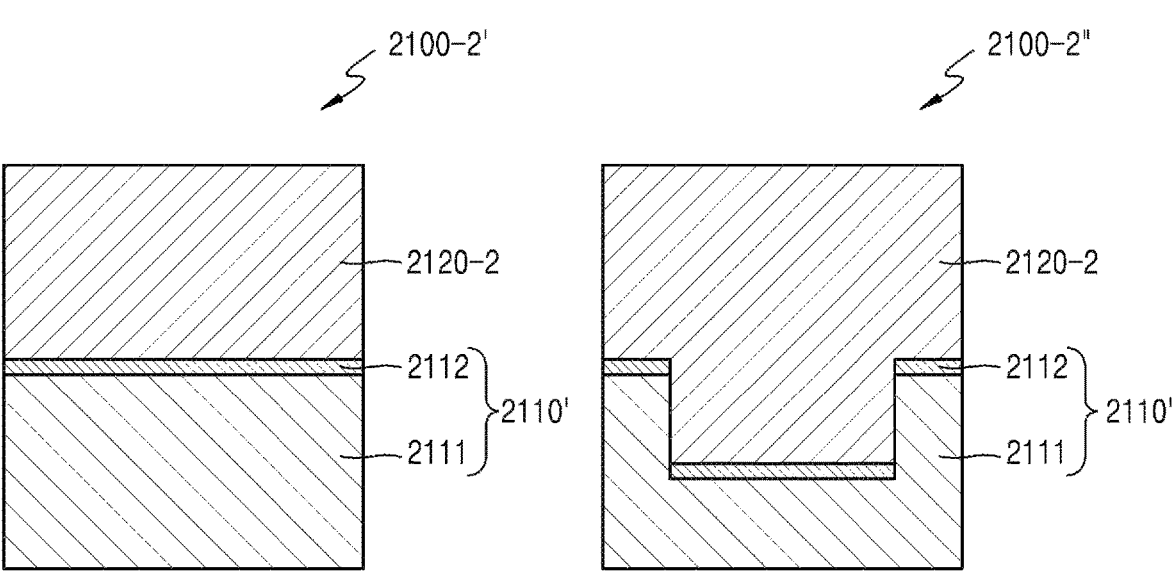
FIG. 16 illustrates schematic structures of a passive radiant cooling layer according to an example of the second embodiment and a passive radiant cooling layer according to another example of the second embodiment.

FIG. 16 illustrates schematic structures of a passive radiant cooling layer 2100-2' according to an example of the second embodiment and a passive radiant cooling layer 2100-2" according to another example of the second embodiment.

The passive radiant cooling layer 2100-2' according to an example of the second embodiment and the passive radiant cooling layer 2100-2" according to another example of the second embodiment are examples of the passive radiant cooling layer 2100-2.

First emission layers 2110' and 2110" respectively of the passive radiant cooling layers 2100-2' and 2100-2" according to the second embodiment may each include a lower plate 2111 and a coating layer 2112 formed on an upper portion of the lower plate 2111. The first emission layers 2110' and 2110" to be described below are examples of the first emission layer 2110 described above.

In the passive radiant cooling layer 2100-2' according to an example of the second embodiment, the lower plate 2111 may be formed in a plate shape having a predetermined thickness. The lower plate 2111 may be a material layer in which radiant energy corresponding to the first band is radiated at an emissivity higher than that of radiant energy of the remaining wavelengths except for the first band. In addition, the lower plate 2111 may be made of a material that is transparent to visible light (e.g., a third band) and has a predetermined emissivity in the infrared band (e.g., the first band).

The lower plate 2111 may be made of at least one of quartz ($SiO_2$), polydimethylsiloxane, SU8, polyurethane, polyimide, TPX, and P(VDF-HFP).

According to an embodiment, the lower plate 2111 is formed of quartz to have a high emissivity in the first band. The lower plate 2111 described above performs a function of a BE having a high emissivity in a relatively wide band so as to increase cooling power. For example, the lower plate 2111 may have a thickness of 4 μm. The lower plate 2111 may be disposed to be in contact with the inside of the vehicle.

The coating layer 2112 is deposited on the upper portion of the lower plate 2111 to have a predetermined thickness, and may be made of, for example, Ag. The coating layer 2112 may be formed to have a thickness of, for example, 100 nm. Sunlight of a predetermined wavelength range (e.g., the third band) is reflected by the coating layer 2112. The coating layer 2112 may perform a function corresponding to the reflection layer 2130 described above.

In the passive radiant cooling layer 2100-2' according to an example of the second embodiment, a second emission layer 2120-2 may be provided on an upper portion of the coating layer 2112 and may be formed in a plate shape having a predetermined thickness and corresponding to the lower plate 2111. In the second embodiment, the second emission layer 2120-2 is a layer in which radiant energy of wavelengths in the second band is radiated at an emissivity higher than that of radiant energy of the remaining wavelengths except for the wavelengths of the second band, and may be made of a polymer that is transparent to the visible light band (e.g., the third band) and has a predetermined emissivity in the infrared band. In the second embodiment, the second emission layer 2120-2 may be made of at least one of polydimethylsiloxane (PDMS), SU8, polyurethane, polyimide, TPX, and P(VDF-HFP). The second band may be in a range of 8 μm to 13 μm.

In the second embodiment, the second emission layer 2120-2 may be formed to have a higher radiation efficiency of radiant energy than the first emission layer 2110'.

Meanwhile, the second emission layer 2120-2 may be formed to have a thickness of 4 μm. For example, the second emission layer 2120-2 may be made of PDMS, and the PDMS has a high extinction coefficient at a predetermined selective wavelength (e.g., the second band), and thus the second emission layer 2120-2 exhibits a relatively high absorption rate (or emission rate) at the predetermined selective wavelength, and exhibits a low absorption rate at the remaining wavelengths.

In the passive radiant cooling layers 2100-2 and 2100-2' according to the second embodiment as described above, the first emission layers 2110 and 2110' may be installed adjacent to the inside of the vehicle, and second emission layers 2120 and 2120-2 may be installed on the upper portions of the first emission layers 2110 and 2110', respectively. The passive radiant cooling layers 2100-2 and 2100-2' according to the second embodiment may absorb heat trapped inside the vehicle as much as possible, the absorbed heat may be diffused to the front through conduction, and the diffused heat may be emitted to an upper portion of the sunroof (i.e., in a direction in which the glass 210 is located) through selective radiation. That is, in the passive radiant cooling layers 2100-2 and 2100-2' according to the second embodiment, the first emission layers 2110 and 2110' provided therebelow may absorb heat in a relatively wide wavelength range, and the second emission layers 2120 and 2120-2 provided thereon may emit the absorbed heat to the external space without interfering with ambient radiation, thereby effectively drawing heat not only from the surface but also from the inner space.

Meanwhile, hereinafter, a schematic structure of the passive radiant cooling layer 2100-2" according to another example of the second embodiment will be described.

Like the passive radiant cooling layer 2100-2' described above, the passive radiant cooling layer 2100-2" according to another example of the second embodiment may have the Janus characteristic in which upper and lower surfaces have different heat radiation characteristics. Elements having the same function as the above-described passive radiant cooling layer 2100-2' are denoted by the same reference numerals, and differences from the above-described passive radiant cooling layer 2100-2' will be mainly described.

The lower plate 2111 of the first emission layer 2110" of the passive radiant cooling layer 2100-2" according to another example of the second embodiment may have a micropattern formed therein having a plurality of insertion grooves formed to be recessed downward from an upper surface to a predetermined insertion depth The insertion groove may be formed in a rectangular structure, and the insertion depth may be 1.5 μm, and the plurality of insertion grooves may have an interval of about 8 μm. Here, the coating layer 2112 may be formed on a top surface of the lower plate 2111 and a bottom surface of the insertion groove.

The second emission layer 2120-2 may be made of PDMS having a thickness of, for example, about 4 μm, and the PDMS has a relatively high extinction coefficient at several selective wavelengths of electromagnetic waves, and thus the second emission layer 2120-2 exhibits a relatively high absorption rate (or emission rate) at the several selective wavelengths, and exhibits a low absorption rate at the remaining wavelengths. However, the second emission layer 2120-2 may exhibit high absorption in a desired wavelength band due to an interaction between the micropattern of the lower plate 2111 of the first emission layer 2110″ and the metal of the coating layer 2112. Accordingly, the second emission layer 2120-2 may implement a selective emitter (SE).

Although the present disclosure has been described with reference to the embodiment shown in the drawings, this is merely an example, and it will be understood by one of ordinary skill in the art that various modifications and variations may be made therefrom. Accordingly, the true technical protection scope of the present disclosure should be determined by the technical spirit of the appended claims.

INDUSTRIAL AVAILABILITY

The present disclosure relates to a sunroof system and may be applied to various systems that can be passively cooled using a radiant cooling structure.

The invention claimed is:

1. A sunroof system for a vehicle, the sunroof system comprising:
   glass slidably insertable into a vehicle body of the vehicle; and
   a passive radiant cooling layer disposed below the glass and slidably insertable into the vehicle body,
   wherein the passive radiant cooling layer includes a first emission layer having a high emissivity in a first band relative to a band outside the first band, a second emission layer having a high emissivity in a second band, which is included in the first band and narrower than the first band, relative to a band outside the second band, and a reflection layer having a high reflectivity in a third band, which is a shorter wavelength than the first band, relative to a band outside the third band,
   wherein the second emission layer having a structure in which a second functional layer is interposed between a first functional layer and a third functional layer, wherein each of the first functional layer and the third functional layer includes a material having a higher light reflectance than the second functional layer, and
   wherein the second functional layer includes a plurality of transparent layers having different refractive indices.

2. The sunroof system of claim 1, wherein the first emission layer is provided below the second emission layer and located adjacent to an inside of the vehicle.

3. The sunroof system of claim 2, wherein the first emission layer includes a lower plate including a material layer in which radiant energy corresponding to the first band is radiated at an emissivity higher than that of radiant energy of the remaining wavelengths except for wavelengths of the first band, and a coating layer made of a metal deposited on an upper portion of the lower plate.

4. The sunroof system of claim 3, wherein the lower plate has a plurality of insertion grooves formed therein to be recessed downward from an upper surface thereof to a predetermined insertion depth.

5. The sunroof system of claim 2, wherein the second emission layer is made of a polymer which is transparent to a visible light band and which has a predetermined emissivity in an infrared band.

6. The sunroof system of claim 1, wherein the second emission layer is disposed below the reflection layer and located adjacent to an inside of the vehicle.

7. The sunroof system of claim 6, wherein the second emission layer includes another reflection layer that is reflective with respect to the third band.

8. The sunroof system of claim 6, wherein the second emission layer includes a resonant layer that resonates with respect to at least the second band.

9. The sunroof system of claim 6, wherein the reflection layer has a high transmittance in the first band relative to the band outside the first band.

10. The sunroof system of claim 6, wherein the second emission layer is a diffractive structure including a two-dimensional structure or a photonic crystal structure, or includes a polymer having a high absorption rate selectively in the second band.

11. The sunroof system of claim 6, wherein the reflection layer includes a polymer that is transparent to infrared light and includes at least one of polyethylene and polypropylene, wherein the polymer is a porous polymer.

\* \* \* \* \*